United States Patent [19]

Hunziker

[11] 3,830,356
[45] Aug. 20, 1974

[54] CONVEYING APPARATUS FOR CONVEYING OF OBJECTS HAVING A GIVEN MINIMUM DIMENSION

[76] Inventor: Werner Hunziker, Staffelbachstrasse 195, Kirchleerau, Switzerland

[22] Filed: Apr. 5, 1972

[21] Appl. No.: 241,227

[30] Foreign Application Priority Data
Apr. 15, 1971  Switzerland.......................... 5435/71
Feb. 23, 1972  Switzerland.......................... 2617/72

[52] U.S. Cl. ............................. 198/127 R, 198/211
[51] Int. Cl. ........................................... B65g 13/02
[58] Field of Search ....................... 198/127 R, 211

[56] References Cited
UNITED STATES PATENTS

| | | | |
|---|---|---|---|
| 1,464,775 | 8/1923 | Reuter | 198/127 R |
| 2,213,489 | 9/1940 | Durand | 198/127 R |
| 3,029,655 | 4/1962 | Morrow | 198/127 R |
| 3,112,024 | 11/1963 | Lakin | 198/127 R |
| 3,677,394 | 7/1972 | Bloom | 198/127 R |

Primary Examiner—Evon C. Blunk
Assistant Examiner—Hodd Lane
Attorney, Agent, or Firm—Michael S. Striker

[57] ABSTRACT

Two or more elongated axially parallel rollers are journalled for rotation in identical directions and have outer peripheries spaced from one another by a distance which is smaller than the minimum dimension of the objects to be conveyed. The rollers define with one another a trough in which the objects are to be conveyed longitudinally and each roller includes a core having mounted thereon a plurality of substantially radially extending conveying elements arrayed axially and each of which has at least a portion inclined in the longitudinal direction of the trough and capable of elastically yielding under pressure.

26 Claims, 18 Drawing Figures

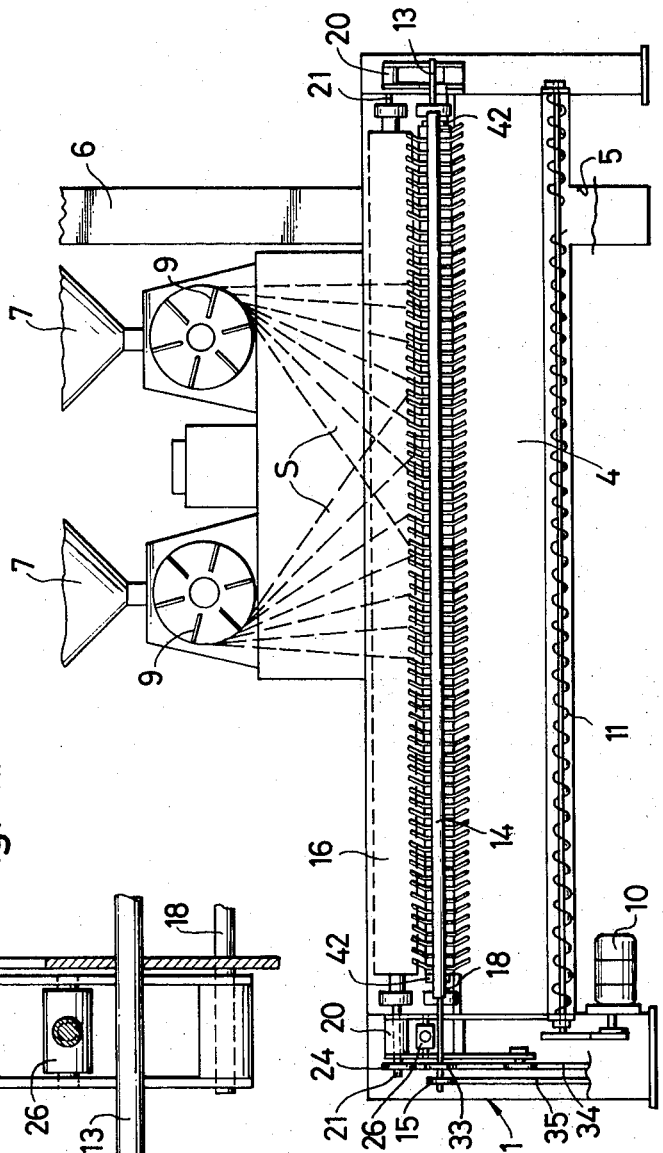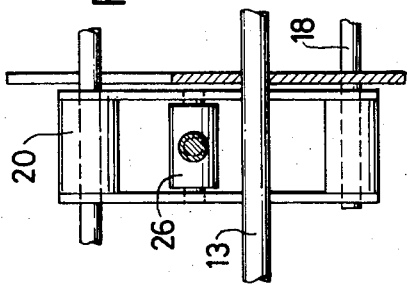

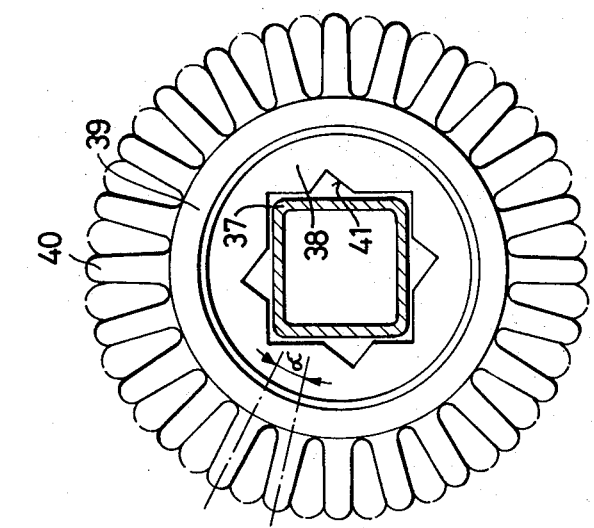
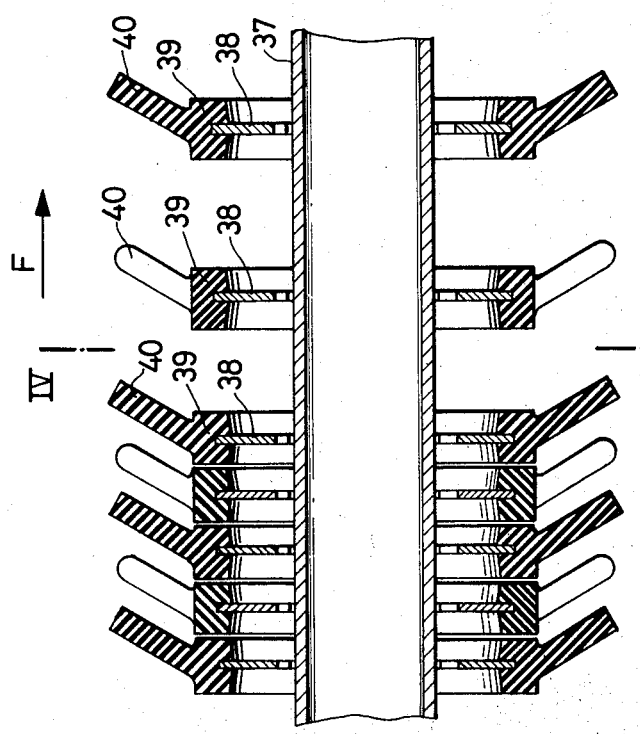
Fig. 4
Fig. 3

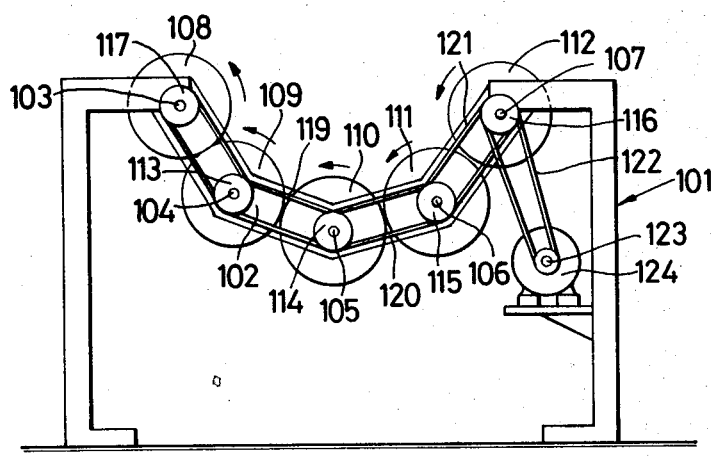
Fig. 7
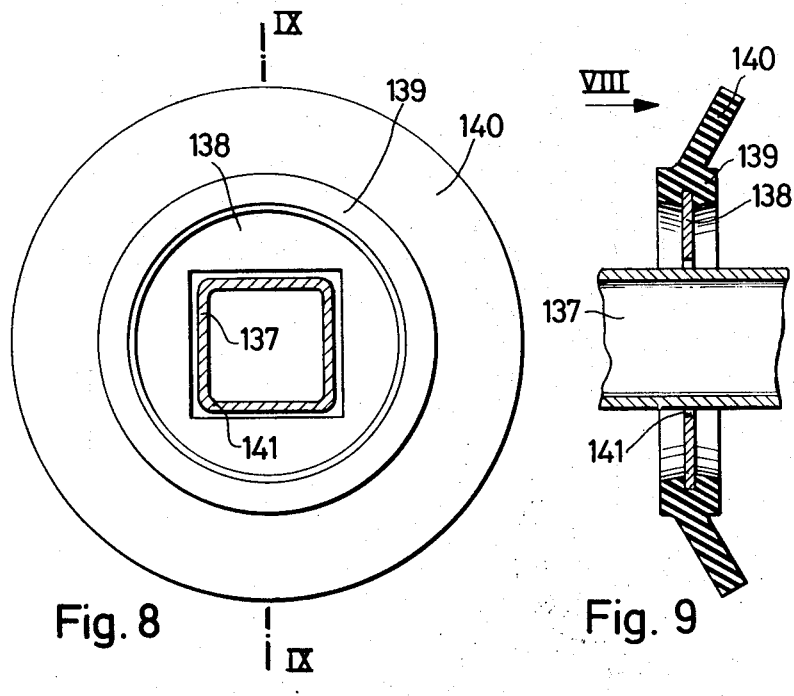
Fig. 8
Fig. 9

3,830,356

CONVEYING APPARATUS FOR CONVEYING OF OBJECTS HAVING A GIVEN MINIMUM DIMENSION

BACKGROUND OF THE INVENTION

The present invention relates generally to conveying apparatus, and more particularly to novel conveying apparatus for conveying of objects of a given minimum dimension.

In many instances it is necessary to be able to convey objects, for instance small manufactured parts, apples, tomatoes or the like, which are not only to be advanced in a certain direction but are to be contacted with a treating material on all sides. This is for instance true if small metal manufactured objects are to be sand-blasted on all sides, or if apples or potatoes are to be washed on all sides, with sprays of water. In all such instances, the problem which is posed is not only to advance the objects past the station where they are to be contacted with the treating medium, that is sand, water ot the like, but also to so turn them that all surface portions of the respective objects will become exposed to the medium emanating from the treating station.

The various conveying devices presently known in the art are not entirely satisfactory for a variety of reasons, given the above considerations, but as yet there has not been forthcoming any significant improvement.

SUMMARY OF THE INVENTION

It is, accordingly, a general object of the present invention to provide an improved conveying apparatus which will afford the desired advantages.

More particularly, it is an object of the present invention to provide an improved conveying apparatus for conveying of objects having a given minimum dimension, which can not only advance the objects longitudinally but will also turn them during such advancement so that all surface portions of the objects will become exposed.

An additional object of the invention is to provide such an improved conveying apparatus which is particularly suitable for use in an installation in which such objects are to be moved past a processing station, to be contacted at the station with water, sand blasts or the like.

In pursuance of these objects and of others which will become apparent hereafter, one feature of the invention resides in a conveying apparatus for conveying of objects having a given minimum dimension, in a combination which briefly stated comprises roller means including at least two elongated axially parallel rollers journalled for rotation and having outer peripheries spaced from one another by a distance smaller than the minimum dimension of the objects to be conveyed. The rollers define with one another a trough in which objects are to be conveyed in a longitudinal direction and each of the rollers includes a core and a plurality of substantially radially extending conveying elements which are arrayed axially on the core and which each have at least a portion inclined in the longitudinal direction and capable of elastically yielding under pressure. Rotating means is provided for rotating the rollers in identical directions.

When the novel conveying apparatus according to the present invention is utilized in conjunction with a device which ejects streams or flows of a treating medium, for instance a liquid, sand for sand blasting or the like, then it assures that per unit weight of treating medium a substantially larger number of objects can be uniformly treated over their surfaces than was the case in conveying apparatus according to the prior art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2a is a section taken on line II—II of FIG. 1;

FIG. 2b is a fragmentary detail view, on an enlarged scale, of a detail of FIG. 2a;

FIG. 3 is a fragmentary axial section through a roller for use in the embodiment of FIG. 1, according to one constructional embodiment of the rollers;

FIG. 4 is a section taken on line IV—IV of FIG. 3;

FIG. 7 is a side- end elevational view in a somewhat simplified illustration showing a further embodiment of the invention;

FIG. 8 is a view of FIG. 9 as seen in the direction of the arrow VIII of that Figure illustrating a further embodiment of a roller for use with one of the preceding embodiments of the conveying apparatus;

FIG. 9 is a section taken on line IX—IX of FIG. 8;

DESCRIPTION OF THE PREFERRED EMBODIMENTS

Figure 1:
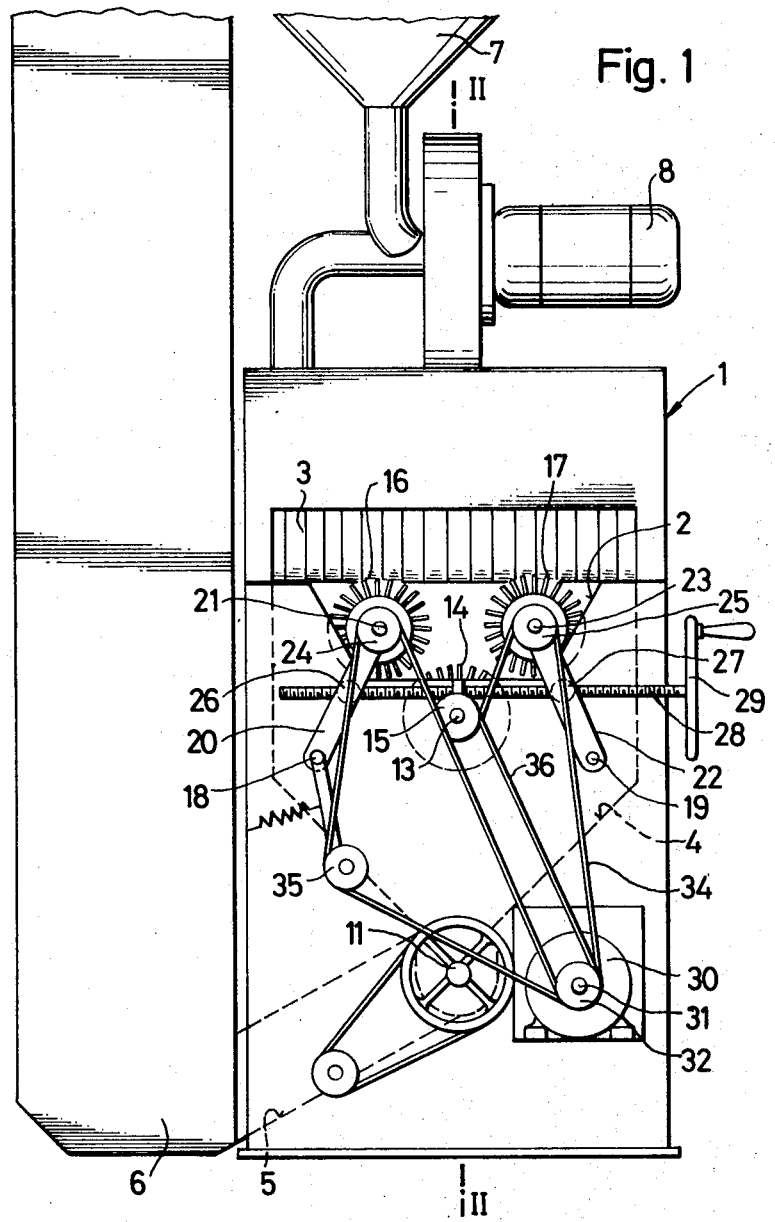
FIG. 1 is an end-elevational view of an apparatus according to one embodiment of the invention.

Discussing now the drawing in detail, and firstly the embodiment illustrated in FIGS. 1 and 2a –2b, it will be seen that there is provided an apparatus designated in toto with reference numeral 1 and having a housing which forms a completely enclosed interior chamber. At one end of the apparatus 1 there is provided an inlet opening 2 through which the objects to be treated are admitted (see FIG. 2a) and at the other end of course there is an outlet opening for the treated objects.

FIG. 1 shows that the inlet opening 2 is at least partially closed by a curtain or hanging 3 composed in the illustrated embodiment, of a plurality of strips of rubber or elastomeric material which hang down from the top of the opening and are capable of yielding when coming in contact with the objects being admitted. This of course prevents treating material, for instance treating liquid, from splashing outside. Downwardly, the chamber is delimited by the funnel-shaped component 4 which is shown in broken lines in FIG. 1 and at the base of which there is located a collecting screw 11 which is driven in rotation by a motor 10. The purpose of the screw 11 is of course to engage the treating medium, particularly if it is sand or the like, which enters into its area of engagement via the component 4, and to advance it into the journal 5 from where the medium is conveyed into an elevator housing 6 in which a non-illustrated elevator is mounted (for instance a bucket-type conveyor or the like) which conveys the medium into a hopper 7 for re-use, that is for admission via a non-illustrated spray nozzle or nozzles or for instance via the illustrated (see FIG. 2a) scoop wheels 9 which are driven in rotation by a motor 8.

Mounted in the housing of the apparatus 1 is the shaft or core 13 of a roller 14, so that the roller 14 can turn. A pulley 15 is mounted on the shaft 13 for transmitting rotational movement to the latter and further rollers 16 and 17 are also mounted for rotation in parallelism with the axis of the roller 13. Together with the roller 14 the rollers 16 and 17 define a trough in which the objects to be conveyed are to advance longitudinally from the inlet to the outlet.

Mounted on the housing of the apparatus 1 are provided two pivots or shafts 18 and 19 extending in parallelism with the axis of the roller 14 and serving to journal the rollers 16 and 17, respectively. The drawing shows, (compare FIGS. 1 and 2a) that they are mounted on the shaft 18 two axially spaced arms 20 which are each mounted on the shaft 18 at one of the end of the arms 20, whereas the free other end carries the shaft or core 21 of the roller 16. The same arrangement is true with respect to the shaft 19 on which there are mounted two axially spaced arms 22 (only one visible) the free ends of which carry the shaft 23 of the roller 17. The shafts 21 and 23 each carry a pulley 24 and 25.

Two of the arms 20 and 22, namely the ones which are visible in FIG. 1, it being understood that the other arms 20 and 21 are axially spaced from and located behind the ones visible in FIG. 1, are each provided with a pivotably mounted guide member 26 and 27, which respectively are provided with tapped bores. The threads in the bore of the guide member 27 are counter to those in the guide member 26, and passing through these tapped bores is a screw spindle 28 whose threads mesh with those of the bores in the guide member 26 and 27. The screw spindle is freely turnably mounted in the housing of the apparatus 1 and can be turned by means of a hand-wheel 29 or the like. It will be appreciated that when the wheel 29 is turned, thereby turning the spindle 28, the rollers 16 and 17 will be moved towards or away from one another in unison and by identical distances, always maintaining their axes 21 and 23 in parallelism with one another and with that of the roller 14.

A motor 30 is also mounted in the housing of the apparatus 1 having an output shaft 31 on which there are provided two pulleys 32, only one of which is visible in the drawing. Further pulley is freely turnably mounted on the shaft 13 intermediate the pulley 15 and the roller 14. A bolt 34 is trained about one of the pulleys 32, the pulleys 34 and 35 and a tension roll 35, being deflected by the pulley 33; this bolt 34 serves to drive the rollers 16 and 17 from the motor 30.

Trained about the other of the pulleys 32 as well as the pulleys 15 is an additional bolt 36 via which the roller 14 is driven from the motor 30. It will be appreciated that the rollers 14, 16, and 17 are all rotated in one and the same direction via the belts 34 and 36. It will further be appreciated that the pulleys 32 could be configurated as variable shieves (as is indeed illustrated in the embodiment of FIGS. 5 and 6) and that the motor 30 can be mounted so that it can be raised and lowered, to thereby permit a variation in the rotational speed of the rollers 14, 16 and 17.

Coming to FIGS. 3 and 4 it will be seen that the rollers 14, 16 and 17 can each be provided with a core tube 37 of here quadratic cross-section onto which are mounted circular conveying elements. These conveying elements are here composed of circular discs 38 whose outer peripheries are surrounded by rubber or elastomeric rings 39 from which there extend finger-shaped portions 40 in axial symmetry in outward direction, these portions 40 being inclined in the direction of the arrow F which designates the advancement of the objects being conveyed. The portions 40 in this embodiment are of the same material as the annulus 39 and made of one piece with the same.

Any two circumferentially adjacent portions 40 include with one another an angle $\alpha$. The discs 38 are mountable on the core tube 37 by being provided with a central opening 41 whose configuration or outline in the illustrated embodiment corresponds to two superimposed squares corresponding to the cross-section of the core tube 37 but offset angularly with reference to one another by an uneven multiple of $\alpha/2$. This means that two axially successive discs 38 can be angularly offset relative to one another about the axis of the core tube 31 in such a manner that the annuli of projections 40 are offset with reference to one another by the same angle $\alpha/2$. The annuli 39 are of course closely adjacent one another and in effect constitute an elastomeric sheath for the core tube 37, protecting the same from damage by the treating medium, for instance by sand if the device is to be used for sand blasting. The discs 38 themselves are pressed axially against one another by retaining rings 42 (see FIG. 2) located at the opposite axial ends of the array of discs 38.

Assuming, for example, that in the apparatus of FIGS. 1 and 2 a series of objects are to be treated having at least substantially the same dimensions and all having a given minimum dimension, then the rollers 16 and 17 are adjusted via the hand wheel 39 with reference to one another and to the roller 14 in such a manner that the objects will become engaged under tension by the resilient portions 40 at least in some angular positions. The motor 30 and the wheels 9 (or the nozzles in place of the wheels 9) are then put into operation, and the wheels 9 eject treating material in an essentially conical configuration S into the trough defined between the rollers 16 and 17. The objects to be treated are then admitted through the opening 2 into the trough defined by the rollers 14, 16 and 17 and, caused by the lateral pressure of the rollers 14, 16 and 17 on the individual objects themselves on the one hand, as well as by the inclination of the portions or projections 40 on the other hand, the objects are advanced in the direction of the arrow F and are simultaneously turned during such advancement.

Advancing longitudinally of the trough and constantly turning the objects then pass through the conical curtain S until they reach the outlet opening and are discharged from the apparatus 1.

Figure 5:
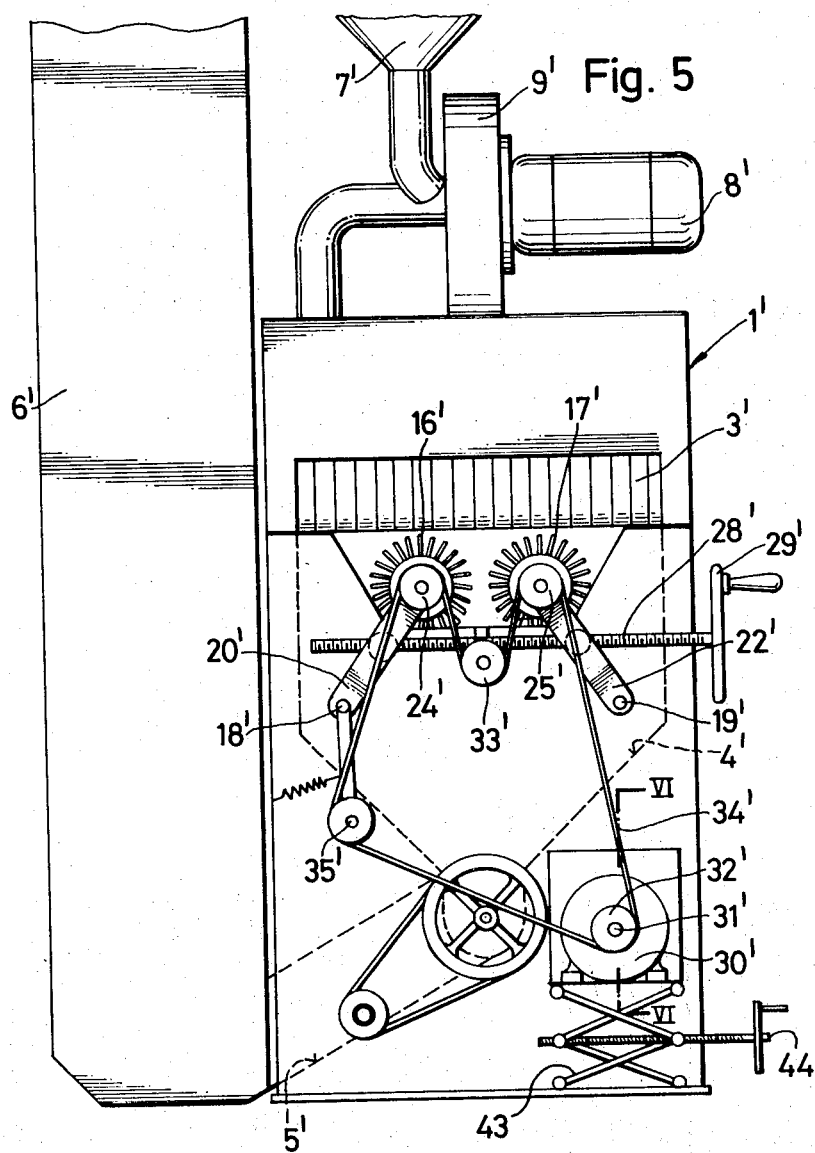
FIG. 5 is a view similar to FIG. 1 illustrating a further embodiment of the invention.
Figure 6:
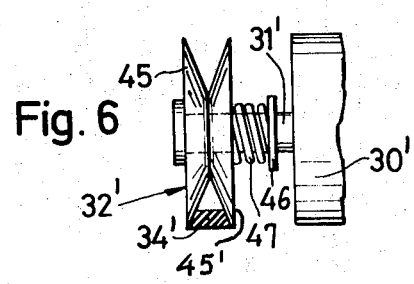
FIG. 6 is a section taken on line VI—VI of FIG. 5.

The embodiment in FIGS. 5 and 6 utilizes for like elements, like reference numerals as in the preceding embodiments. In FIGS. 5 and 6, however, the roller 114 and the associated drive components such as the belt 15, the belt 36 and the second pulley 32 are omitted. The motor 30 is here mounted on a lifting device 43 and can be adjusted in its height by means of a wheel 44.

Motor 30' has an output shaft 31' which carries a variable sheave 32' composed of two flanges 45 and 45' of which the former is fast with the shaft 31' whereas the flange 45' is axially displaceable on the shaft 31' but cannot rotate with reference to the same. There is further provided an abutment 46, for instance in form of an annular rib or shoulder, on the output shaft 31' and a helical expansion spring 47' surrounds the output shaft and bears upon the abutment 46 and the flange 45', respectively. Thus, the flanges 45 and 45' are pressed against one another under the pressure of the spring 47.

The motor 30' drives the rollers 16' and 17' in identical direction via the drive belt 34', the sheave 32', the pulleys 24' and 25', the deflecting roller 33' and the tension roller 35'. The embodiment in FIGS. 5 and 6 is particularly suitable for transporting of rodshaped objects and depending upon the diameter of the objects it is merely necessary to shift the rollers 16' and 17' towards and away from one another with the aid of the hand wheel 29' to adjust the smallest distance between the outer peripheries so as to be less than the minimum diameter of the rod-shaped objects.

Once this is done the motor 30' and the wheels 9' are started and thereafter the rod-shaped objects are admitted into the trough defined by the rollers 16' and 17' in parallelism with the latter. These rollers 16' and 17' continuously advance the rod-shaped objects in the direction of the arrow F and simultaneously turn them until they, having passed through the conical curtain of material ejected by the wheels 9' leave at the outlet end of the apparatus 1'.

If the rotational speed of the rollers 16' and 17' (and thereby that of the rod-shaped objexts being conveyed) is to be increased, the wheel 44 is turned in a sense racing the motor 30 so that the two flanges 35 and 35' of the variable sheave 32' can move closer together under the pressure of the spring 47', increasing the effective diameter of the sheave 32' and thereby the speed of rotation of the rollers. Conversely, if the speed of rotation is to be decreased, then the motor 30' is lowered by requisite turning of the wheel 44, and this results in exertion of pressure by the pulley on the variable sheave 32' causing the flange 45' to move away from the flange 45 against the action of the spring 47, reducing the effective diameter of the sheave 32'.

Coming now to the embodiment in FIG. 7, it will be seen that reference numeral 101 d signates a stationarily mounted support of whatever configuration or type. Inasmuch as FIG. 7 is an end view it will be appreciated that only one end is visible, it being understood that the other end is to be considered as being spaced from and concealed behind the visible end in the direction normal to the plane of the drawing.

At these opposite ends the support 101 is provided with respective downwardly semi-circularly curved cross-members 102 which of course again only one is visible. Mounted in these cross-members 102 are the axes 103, 104, 105, 106 and 107 of five conveying rollers 108, 109, 110, 111 and 112. The rollers 108 – 112 can thus turn about the shafts 103 – 107. Mounted on the shafts 104–107 are pairs of immediately adjacent belt pulleys 113 – 116 so that they rotate with the respective shafts; each of these pairs of belts pulleys 113 – 116 is to be understood as represented in FIG. 7 as by one which is visible, whereas the other one is located behind it and concealed by it in this illustration. The belt pulleys have a counterpart by a further belt pulley 117 which is mounted on the shaft 103 for rotation therewith. Drive belts 118 – 121 connect the belt pulleys 113– 117 in driving relationship and a further drive belt 122 connects the front one (the visible one) of the two pulleys 116 with the output shaft 123 of an electromotor 124.

It will be understood that electromotor 124 turns shaft 107 of roller 112 and the shaft 107 of course turns via the pulleys associated with the rollers 108 – 111, and the connecting belts 118 – 121, the rollers 108 – 111 in identical direction, as indicated by the arrows in FIG. 7.

It will be seen that the rollers 108 – 112 define with one another a horizontal trough in which the objects to be conveyed are to advance. Of course the distance between the peripheries of any two adjacent ones of the rollers 108 – 112 is so selected that it is smaller than the minimum dimension of the object to be conveyed. Advantageously, the peripheries of the rollers which are laterally adjacent one another will contact. If, now, at the front end visible in FIG. 7, objects are admitted into the trough with the rollers 108 – 112 in rotation then these objects are advanced longitudinally (normal to the plane of FIG. 7 in direction away from the viewer), while being simultaneously turned by their own axes.

If FIGS. 8 and 9 I have illustrated a further embodiment showing how the rollers can be configurated. This is analogous to the embodiment in FIGS. 3 and 4, but the elastically yieldable portions of the conveying elements are different. The shaft or core of the rollers is again of a tubular form, being identified with reference numeral 127 and having pushed onto it discs 138 having center openings 141 for this purpose. The periphery of the discs 138 is surrounded by elastomeric rings 139 whose totality (when all of the elements are axially arrayed on the core tube 137) forms a protection for the core tube 137.

Unlike the embodiment in FIGS. 3 and 4, the embodiment in FIGS. 8 and 9 does not have individual projections. Instead, the ring 139 surrounding each of the discs 138 is provided on its outer periphery with an annular flange 140 which is of the same material as the ring 139 and which has a circular outer edge. It is inclined as shown in FIG. 9, and this inclination is to be understood as being in the direction of the arrow F in which the objects are to be advanced. With this embodiment it is particularly simple to advance and turn light-weight profiled members, in form of bundles, for instance, members which are used for edges of skies or the like. The speed of advancement in axial direction is less than in the embodiment of FIGS. 3 and 4, and thus even if a smaller number of nozzles or wheels 9' are used for the ejection of a treating medium, an even uniform treatment of such objects is assured.

Figure 10:
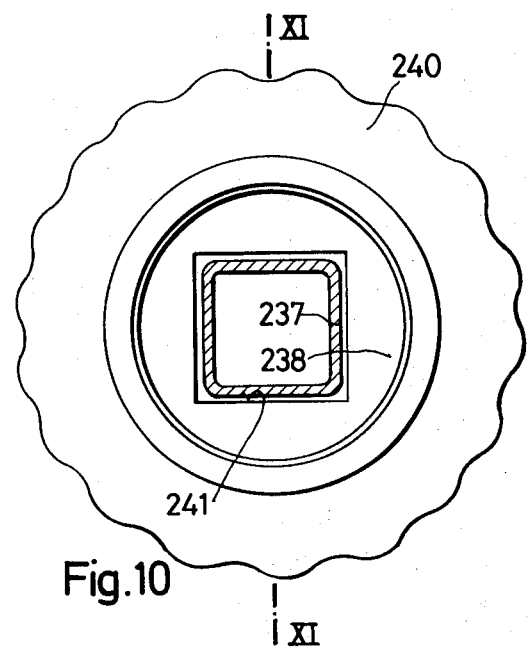
FIG. 10 is a view similar to FIG. 8, but in the direction of the arrow X in FIG. 11.
Figure 11:
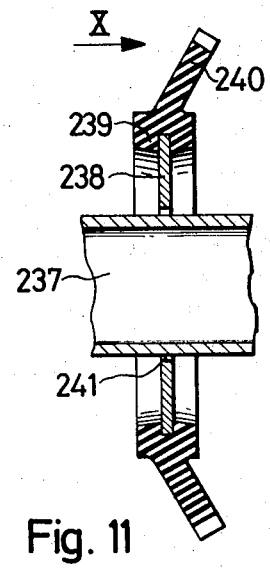
FIG. 11 is a section taken on line XI—XI of FIG. 10.

In FIGS. 10 and 11 there is illustrated a further embodiment showing how the rollers can be configured. The core tube is identified with reference numeral 237 and the discs with reference numeral 238, each being provided for mounting purposes with a central opening 241 through which the core tube 237 is to be pushed. Each disc periphery is again surrounded by an annulus 239 of elastomeric material, and together these annuli again form a protective disclosure for the core tube 237. The flange 240 is similar to the flange 140 of FIGS. 8 and 9, except that its outer edge is not circular but is instead of wavy configuration as particularly clearly shown in FIG. 10.

Figure 12:
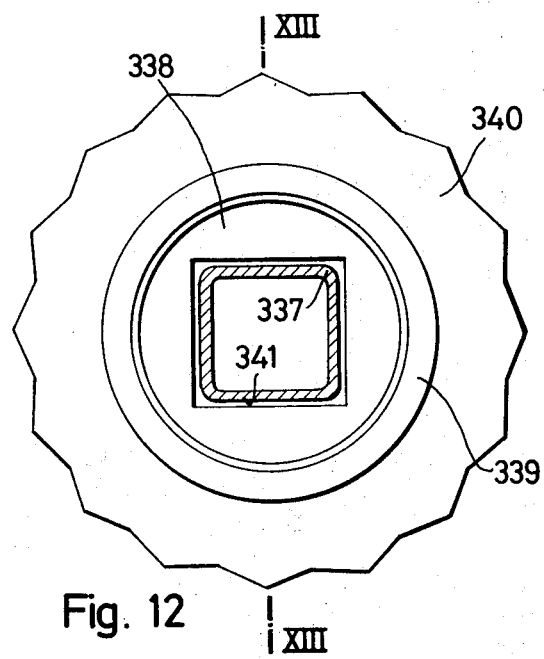
FIG. 12 is a view similar to FIG. 10 but as seen in the direction of the arrow XII in FIG. 13.
Figure 13:
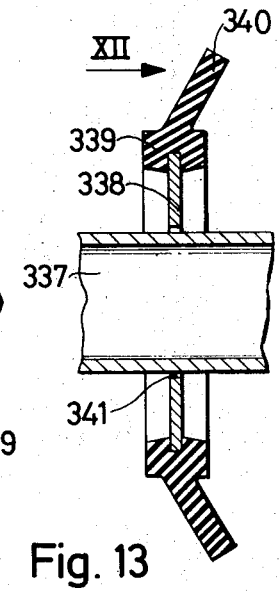
FIG. 13 is a section taken on line XIII—XIII of FIG. 12.

The embodiment in FIGS. 12 and 13 is almost identical with that of FIGS. 10 and 11. The core tube is identified with reference numeral 337, carrying the discs 338 which for this purpose are provided with the openings 241. The annular elastomeric rings are identified with reference numeral 339 and again provide the protection desired for the core tube 337. The flanges are identified with reference numeral 340 but, contrary to the wavy configuration in FIGS. 10 and 11, the edge of the flange here is of zig-zag shaped configuration. Both in FIGS. 10 and 11 and in FIGS. 12 and 13, a more uniform rotation of objects is achieved, particularly if the objects are rod-shaped relatively complicated profiled objects, than can be had with the embodiment of FIGS. 8 and 9.

Figures 14, 15:
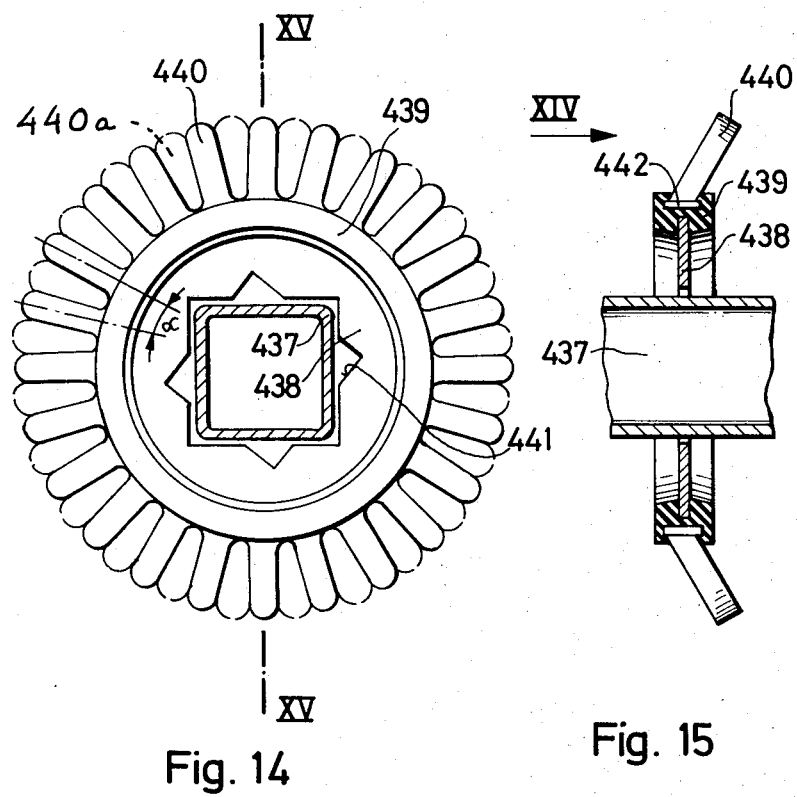
FIG. 14 is a view similar to FIG. 12 but as seen in the direction of the arrow XIV in FIG. 15.
FIG. 15 is a section taken on line XV—XV of FIG. 14.

Coming to FIGS. 14 and 15 it will be seen that this embodiment is analogously illustrated to FIGS. 13 and 14. The core tube is here identified with reference numeral 437 carrying the discs 438 provided for this purpose with the central openings 441. The configuration of the openings 441 is analogous to that illustrated and described with respect to FIGS. 3 and 4, in that it permits angularly displaced mounting of axially successive discs 438 with the angle of displacement being indicated with α in FIG. 14. This means that the projections 440, 440a of axially adjacent ones of the elements (compare FIG. 14) can be so offset with reference to one another that each projection 440a of one element can be located in the space between two circumferentially adjacent projections 440 of the axially adjacent element, as shown in FIG. 14.

Each of the discs 438 is again surrounded at its periphery by elastomeric annulus or ring 439 which, however, in this embodiment is provided with projections 440 not of one piece with it but instead composed of a suitable material, such as a hard steel. The projections 440 each have a widened base portion 442 embedded in the annulus 439 as shown in FIG. 15. The inclination of the projections 440 is again in the direction in which objects are to be advanced longitudinally of the trough.

Figure 16:
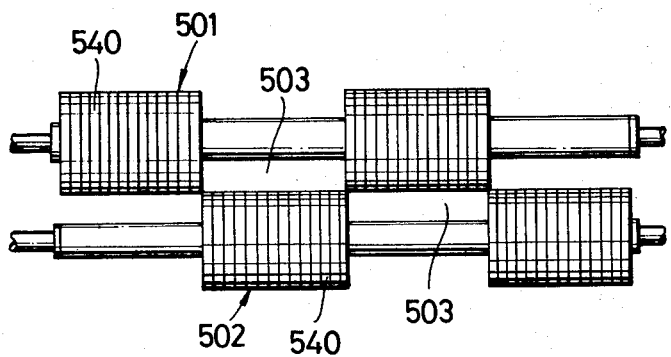
FIG. 16 is a plan view in simplified illustration of a further embodiment of the invention.
Figure 17:
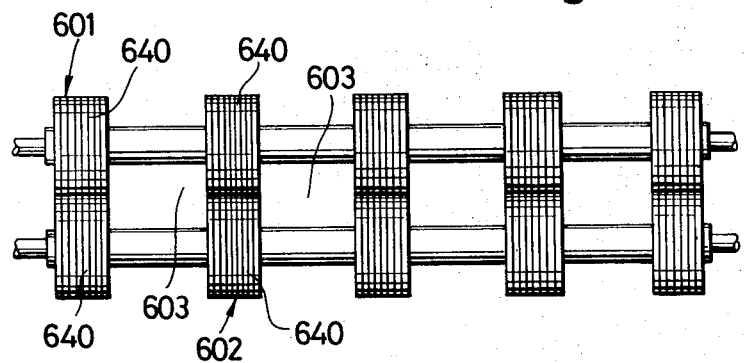
FIG. 17 is a view similar to FIG. 16 illustrating still another embodiment of the invention.

Coming, finally, to FIGS. 16 and 17, it will be seen that there are here illustrated two further embodiments of the rollers, embodiments which are particularly advantageous if rodge shaped or light-weight profiled objects are to be conveyed and turned.

In FIG. 16 I have illustrated an embodiment utilizing two rollers 501 and 502 which extend in axial parallelism with one another and again are to be understood as forming a trough with one another. Of course, more than two of such rollers can be provided if desired.

Each of the rollers has mounted on it a plurality of elements 540 which may be according to any of the previously described embodiments, but which are mounted in groups, with the groups being axially spaced from one another, as shown. The groups of the two adjacent rollers 501 and 502 are so axially offset with one another that the axial end of one group is flush in transverse direction with the axial beginning of a groove on the other roller, and vice versa. The result of this that free spaces 503 exist between the adjacent rollers so that if this embodiment is used in an arrangement in which for instance sand is to be sprayed onto the objects to be advanced, the sprays can be directed into these free spaces 503, keeping them thus away from the components of the rollers 501 and 502 and avoiding damage to the same. The peripheries of the groups of elements 540 may overlap between the two rollers, if desired, in order to make it possible to advance and turn even rod-shaped or profiled objects of very light weight.

The embodiment illustrated in FIG. 17, finally is intended for the same purpose as that in FIG. 16, namely for the conveyance and turning of rod-shaped or lightweight profiled objects. There are illustrated two rollers 601 and 602, but of course there could be more than two of these provided. Each of the rollers 601 and 602 is again provided with a plurality of the conveying elements which may be any of the once in the preceding embodiments, but which are again mounted in groups 640. Here, however, the groups 640 of the two adjacent rollers are not offset as in FIG. 16, but instead are transversely aligned, forming again free spaces 603 between the rollers into which spaces jets of treating medium, such as sand, liquid or the like can be directed in order to prevent to the maximum extent possible contact with the components of the rollers.

It will be understood that each of the elements described above, or two or more together, may also find a useful application in other types of constructions differing from the types described above.

While the invention has been illustrated and described as embodied in a conveying apparatus, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In an apparatus for conveying of objects having a given minimum dimension, in combination, roller means including at least two elongated axially parallel rollers journalled for rotation and having outer peripheries spaced from one another by a distance smaller than said minimum dimension, said rollers defining with one another a trough deep enough to accommodate within its confines the objects which are to be conveyed in longitudinal direction of said trough, and each of said rollers including a core and a plurality of conveying elements arrayed axially on said core and each of which is composed of an inner disc member having a peripheral edge portion and an outer annular conveying member inclined in said longitudinal direction, consisting of elastically yieldable material and having an inner annular edge portion provided with an inwardly facing annular groove engaging said peripheral edge portion of said disc member; and rotating means for rotating said rollers in identical direction.

2. In an apparatus as defined in claim 1, said portions being bristles.

3. In an apparatus as defined in claim 1, said portions being annuli of projections each surrounding the axis of rotation of the roller.

4. In an apparatus as defined in claim 1, said portions being lamellae.

5. In an apparatus as defined in claim 1, said portions being annular flanges.

6. In an apparatus as defined in claim 1; and further comprising varying means for varying said distance between said peripheries at will.

7. In an apparatus as defined in claim 1; further comprising a third roller defining with said at least two rollers said trough and having an axis of rotation which is located in a common plane with the axis of rotation of one of said two rollers and above the axis of rotation of the other of said two rollers.

8. In an apparatus as defined in claim 7; and further comprising varying means for varying the distance of the peripheries of said third roller and said one roller with reference to the periphery of said other roller.

9. In an apparatus as defined in claim 1, said elements each having an inner annular portion surrounding said core, and said inclined portion beinf provided on said inner annular portion, both of said portions being of elastomeric material.

10. In an apparatus as defined in claim 1, said elements each further including an inner annular portion surrounding said core and composed of elastomeric material, said inclined portion being provided on the circumference of said inner annular portion.

11. In an apparatus as defined in claim 1, further comprising additional ones of said rollers mounted for rotation in said support means and extending in axial parallelism with said two rollers, all of said rollers together forming a trough of substantially arcuate cross-section.

12. In an apparatus as defined in claim 1, adjacent plurality of elements being arranged in groups on the respective rollers, said groups being axially spaced from each other on each roller.

13. In an apparatus as defined in claim 12, wherein each group of elements of one roller is located between two successive groups of elements on the other roller.

14. In an apparatus as defined in claim 12, wherein the opposite axial ends of each group of one roller are located in common transverse planes with the opposite axial ends of a group of the other roller.

15. In an apparatus as defined in claim 1; further comprising a housing surrounding said rollers; and an inlet and an outlet end on said trough for admission and removal of said objects.

16. In an apparatus for conveying of objects having a given minimum dimension, in combination, roller means including at least two elongated axially parallel rollers journalled for rotation and having outer peripheries spaced fron one another by a distance smaller than said minimum dimension, said roller defining with one another a trough in which objects are to be conveyed in longitudinal direction, and each of said rollers including a core and a plurality of substantially radially extending conveying elements arrayed axially on said core and which each have at least a portion inclined in said longitudinal direction and capable of elastically yielding under pressure; a third roller defining with said two rollers said trough and having an axis of rotation located in a common plane with the axis of rotation of one of said two rollers and above the axis of rotation of the other of said two rollers; journalling means for said third roller and one roller and including a portion having a bore extending transverse to said longitudinal direction, one of said bores being provided with a right-hand thread and the other of said bores with a left-hand thread; varying means for varying the distance of the peripheries of said third roller and said one roller with reference to the periphery of said other roller and including an axially stationary freely turnable threaded spindle extending through said bores and meshing with the threads thereof; and rotating means for rotating said rollers in identical directions.

17. In an apparatus as defined in claim 16, said journalling means including respective arms each mounted for pivotal displacement about an axis paralleling the axis of rotation of the respective roller.

18. In an apparatus as defined in claim 16, said journalling means including respective arms, and pivot means mounting said arms for pivotal displacement about respective pivot axes paralleling the axes of rotation of said rollers and located at a level below said axes of rotation.

19. In an apparatus as defined in claim 16, said journalling means including respective arms, and pivot means mounting said arms for pivotal displacement about respective pivot axes paralleling the axes of rotation of said rollers and located at a level above said axes of rotation.

20. In an apparatus for conveying of objects having a given minimum dimension, in combination, roller means including at least two elongated axially parallel rollers journalled for rotation and having outer peripheries spaced from one another by a distance smaller than said minimum dimension, said rollers defining with one another a trough in which objects are to be conveyed in longitudinal direction, and each of said rollers including a core and a plurality of substantially radially extending conveying elements arrayed axially on said core and which each have at least a portion inclined in said longitudinal direction and capable of elastically yielding under pressure, said elements each further including an inner annular portion surrounding said core and composed of elastomeric material, and said inclined portion being provided on the circumference of said inner annular portion and composed of a plurality of circumferentially distributed projections of steel each having a base imbedded in the elastomeric material of said inner annular portion; and rotating means for rotating said rollers in identical directions.

21. In an apparatus for conveying of objects having a given minimum dimension, in combination, roller means including at least two elongated axially parallel rollers journalled for rotation and having outer peripheries spaced from one another by a distance smaller than said minimum dimension, said rollers defining with one another a trough in which objects are to be conveyed in longitudinal direction, and each of said rollers including a core in form of a tubular member of polygonal cross-section, and a plurality of substantially radially extending conveying elements arrayed axially on said core and which each have at least a portion inclined in said longitudinal direction and capable of elastically yielding under pressure, said conveying elements each having a disk portion of circular outline provided with a center opening whose cross section corresponds at least substantially to that of said tubular member with the latter extending therethrough, and said elements further having an inner annular portion of elastomeric material surrounding said core and the periphery of said disk portion with said inclined portion being composed of an annulus of axially symmetrically arranged projections.

22. In an apparatus for conveying of objects having a given minimum dimension, in combination, roller means including at least two elongated axially parallel rollers journalled for rotation and having outer peripheries spaced from one another by a distance smaller than said minimum dimension, said rollers defining with one another a trough in which objects are to be conveyed in longitudinal direction, and each of said rollers including a core in form of a tubular member of polygonal cross section, and a plurality of substantially radially extending conveying elements arrayed axially on said core and which each have at least a portion inclined in said longitudinal direction and capable of elastically yielding under pressure, said conveying elements each including an inner annular portion surrounding said core and composed of elastomeric material and a disk portion of circular outline provided with a center opening whose cross section corresponds at least substantially to that of said tubular member with the latter extending therethrough, said inner annular portion surrounding the periphery of said disk portion and said inclined portion being of one piece with said inner annular portion surrounding the same and being configurated as a resiliently yieldable annular flange.

23. In an apparatus as defined in claim 22, said annular flange having an outer circumferential edge of wavy outline.

24. In an apparatus as defined in claim 22, said annular flange having an outer circumferential edge of zig-zag shaped outline.

25. In an apparatus for conveying of objects having a given minimum dimension, in combination, roller means including at least two elongated axially parallel rollers journalled for rotation and having outer peripheries spaced from one another by a distance smaller than said minimum dimension, said rollers defining with one another a trough in which objects are to be conveyed in longitudinal direction, and each of said rollers including a core in form of a member of polygonal outline, and a plurality of substantially radially extending conveying elements arrayed axially on said core and which each have at least a portion inclined in said longitudinal direction and capable of elastically yielding under pressure, said conveying elements each including a disk-shaped portion provided with a corresponding polygonal opening through which said core extends, an inner annular portion surrounding the periphery of said disk-shaped portion and being of elastomeric material, and said inclined portion surrounding said inner annular portion; retaining means provided on said core for retaining said plurality of elements against axial displacement; and rotating means for rotating said rollers in identical directions.

26. In an apparatus as defined in claim 25, circumferentially adjacent ones of said projections including with one another a given angle; and wherein said outlines are angularly offset relative to one another by an uneven multiple of said given angle.

* * * * *